United States Patent
Jayet et al.

(10) Patent No.: US 7,744,003 B2
(45) Date of Patent: Jun. 29, 2010

(54) MICROCIRCUIT CARD WHEREOF THE PERFORMANCES CAN BE MODIFIED AFTER PERSONALIZATION

(75) Inventors: Stéphane Jayet, Meyzieu (FR); Jean-Claude Huot, Jouy-en-Josas (FR)

(73) Assignee: Oberthur Technologies, Levallois-Perret (FR)

( * ) Notice: Subject to any disclaimer, the term of this patent is extended or adjusted under 35 U.S.C. 154(b) by 927 days.

(21) Appl. No.: 10/530,203

(22) PCT Filed: Sep. 29, 2003

(86) PCT No.: PCT/FR03/02854

§ 371 (c)(1),
(2), (4) Date: Mar. 6, 2006

(87) PCT Pub. No.: WO2004/032042

PCT Pub. Date: Apr. 15, 2004

(65) Prior Publication Data

US 2006/0231632 A1   Oct. 19, 2006

(30) Foreign Application Priority Data

Oct. 4, 2002   (FR)   ................... 02 12340

(51) Int. Cl.
*G06K 19/06* (2006.01)
(52) U.S. Cl. .................... 235/492; 235/382; 235/382.5; 709/223
(58) Field of Classification Search ................. 235/492, 235/382, 382.5; 709/223
See application file for complete search history.

(56) References Cited

U.S. PATENT DOCUMENTS 6,273,335 B1    8/2001   Sloan
2002/0103891 A1*  8/2002   Sato ........................... 709/223

FOREIGN PATENT DOCUMENTS

| EP | 0479617 | 4/1992 |
| EP | 1143688 | 10/2001 |
| EP | 1223565 | 7/2002 |

* cited by examiner

*Primary Examiner*—Michael G Lee
*Assistant Examiner*—Kristy A Haupt
(74) *Attorney, Agent, or Firm*—Young & Thompson

(57) ABSTRACT

The invention concerns a microcircuit card comprising means (RX) for receiving a command and means for modifying at least one performance of the card capable of being implemented after a step of personalization of the card.

19 Claims, 2 Drawing Sheets

MICROCIRCUIT CARD WHEREOF THE PERFORMANCES CAN BE MODIFIED AFTER PERSONALIZATION

BACKGROUND OF THE INVENTION

The present invention concerns a microcircuit card whereof the performance can be modified after a step of personalization of the card, and a method for configuring this kind of card.

In the remainder of this document, the term "customization" (personalization) will be understood in the sense in which it is routinely used by the person skilled in the microcircuit card art, or as defined by W. Rankl and W. Effing in the document "Smart Card Handbook, Second Edition, Ed. John Wiley & Sons, Ltd." in the following terms:

"The term customization, in its widest sense, means that the data specific to a card or to a person is entered in the card. This data may for example, be a name, an address, and also includes keys associated with the card. The only thing that is important is that this data is specific to this card."

The invention finds one special but nonlimiting application in the field of mobile telecommunication microcircuit cards such as SIM cards conforming to the GSM standard and cards conforming to similar standards such as the CDMA, TDMA or UMTS standards. In this context, the invention enables modification of the performance of a customized mobile telecommunication card already allocated to a user subscribing to a mobile telephone service.

Modifying the clock frequency of a microcircuit card before the step of personalization of the card is already known to the person skilled in the art.

This kind of process is used in particular during the phases of developing a microcircuit card, during which the cards are tested at different clock frequencies, the clock frequency of the card then being fixed before the end of the personalization process.

However, in the prior art, the performance of the card cannot be modified after the personalization of the card.

It would nevertheless be desirable to be able to modify the performance of a microcircuit card after personalization, in particular after it is sold, or more generally after it has been allocated to a user.

SUMMARY OF THE INVENTION

To this end, the invention relates to a microcircuit card including means for receiving a command and means for modifying at least one characteristic of the performance of said card on reception of said command, it being possible for the modification means to be used after a step of personalization of said card.

In a complementary manner, the invention relates according to a second aspect to a method of configuring a microcircuit card comprising the following successive steps:
 personalization of said card;
 reception of a command; and
 modification of at least one characteristic of the performance of the card on reception of said command.

In the context of the present invention, a characteristic of "performance" of a microcircuit card that can be modified by a configuration method conforming to the present invention must be understood as referring to any hardware or software characteristic pre-existing in the card and not accessible after personalization.

The invention thus enables the performance of a microcircuit card to be enhanced or degraded by sending the command cited above after personalization, the card having been already allocated to a user. In contrast, without the present invention, a user requiring to use a card with new performance must necessarily change the microcircuit card.

Thus, on reception of the appropriate command, the user of a microcircuit card including a physical EEPROM of 64 kbytes but in which the size of the usable area has been limited to 32 kbytes before personalization, can use all of the 64 kbytes of the physical memory, without having to change the card.

According to one advantageous feature, the microcircuit card further comprises means for authenticating the sender of the command.

In a preferred embodiment, those authenticating means comprise cryptographic means for verifying if the command was encrypted with a predetermined authentication key.

These verification means may use a hashing function of an MD4, MD5 or SHA-1 algorithm.

Thus, according to this advantageous feature, modification of the performance of the card necessitates a knowledge of the authentication key, which may be kept secret by an operator, the manufacturer of the card or any third party, thereby reserving the possibility of modifying the performance of the card.

In a variant, the above authentication key is associated with the modification of a predetermined characteristic of the performance of a predetermined card.

According to another feature, the modification means are adapted to determine which characteristic of the performance of the card must be modified as a function of a predetermined instruction received in the command.

This feature enables, in accordance with the predetermined instruction received in the command, modification of one or several characteristics of the card.

In a particularly advantageous embodiment, the receiver means are adapted to receive the command in accordance with the SMS protocol or a similar protocol such as the MMS (MultiMedia Service) protocol.

This embodiment therefore allows the modification of at least one characteristic of the performance of the card via a mobile telecommunication network.

Of course, in other embodiments, the command may be received by the receiver means through a cable network or locally.

According to a preferred embodiment of the card according to the invention, the modification means are adapted to modify the size of a usable area of a physical memory of the card.

This feature therefore allows the memory capacity of the card to be increased, for example to allow the downloading of new applications into the card.

In a preferred variant of this embodiment, the size of the usable area of the physical memory is modified by creating or by destroying at least one specific file contained in the physical memory or by modifying the size of at least one specific file contained in the physical memory.

This file may be a file specifically created to occupy space in the physical memory or a data file used by an application of the microcircuit card.

In another preferred embodiment, the means for modification of at least one characteristic of performance are adapted to modify a clock frequency of the card, reversibly or not.

According to this particular feature, the calculation speed of a processor or a cryptographic component of the card may be accelerated, enabling more complex processing to be carried out on digital data received by the microcircuit card.

In another embodiment, the means for modification of at least one characteristic of performance are adapted to allow or prevent the use of at least one software function of the card, reversibly or not.

This particular feature thus allows validation of software applications initially provided on the card but invalidated before the end of its personalization.

This kind of software function may for example be a cryptographic function, such as a function for checking a digital data signature.

Similarly, in another embodiment, the means for modification of the performance of the card are adapted to allow or prevent the use of the whole or part of an electronic circuit of the card, reversibly or not, that electronic circuit being a cryptographic unit, for example.

The cryptographic processes that were performed by software can advantageously be accelerated by the use of this cryptographic unit.

In a preferred embodiment, the microcircuit card according to the invention further comprises synchronization means adapted to verify that the command is unique.

This particular feature advantageously avoids dishonest use of the microcircuit card by preventing a second execution of a command already received and fraudulently copied.

The advantages and particular features specific to the configuration method of the invention will not be reviewed here, because they are similar to those explained above in relation to the microcircuit card according to the invention.

BRIEF DESCRIPTION OF THE DRAWINGS

Other characteristics and advantages of the present invention will appear more clearly on reading the following descriptions of a particular embodiment that follows, given by way of nonlimiting example and with reference to the appended drawings, in which.

DETAILED DESCRIPTION OF THE PREFERRED EMBODIMENTS

Figure 1:
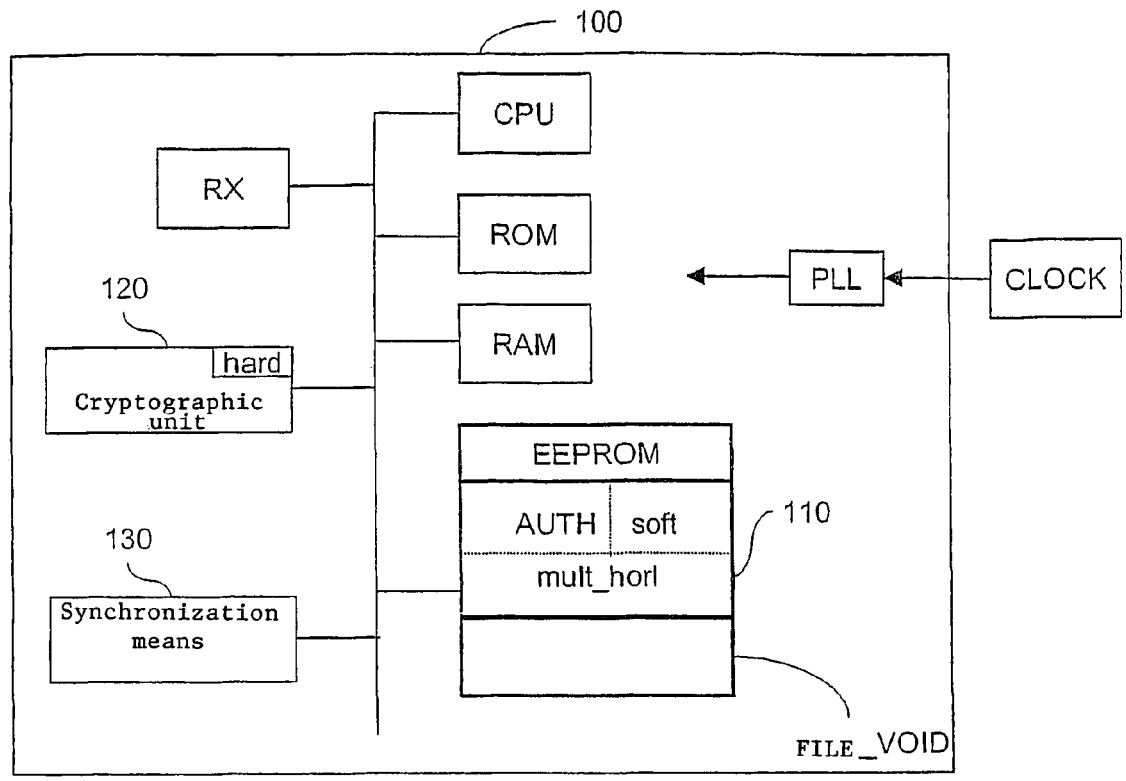
FIG. 1 is a diagram of the architecture of a microcircuit card according to the invention.

FIG. 1 is a diagram of the architecture of a microcircuit card 100 according to the invention.

The microcircuit card 100 principally comprises a processor CPU associated in the conventional way with a certain number of memories of RAM, ROM and EEPROM type.

Figure 3:
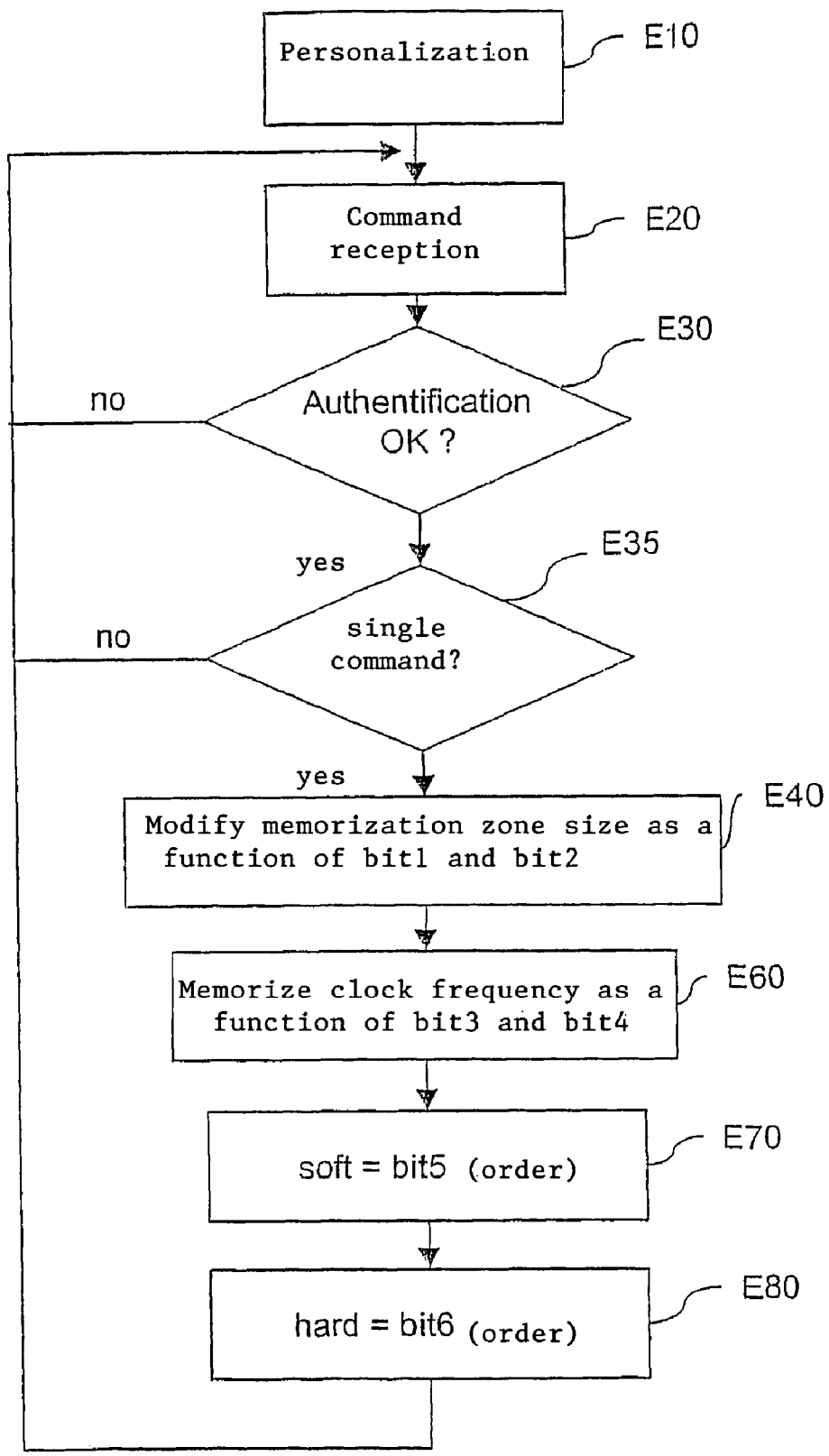
FIG. 3 is a flowchart of the main steps of a preferred embodiment of a configuration method according to the invention.

The memory ROM comprises in particular the instructions of a computer program adapted to implement a configuration method conforming to the present invention, the main steps of which are described later with reference to FIG. 3.

Similarly, the random access memory RAM comprises registers necessary for the execution of this program.

The microcircuit card 100 also comprises a physical memory, for example a memory of EEPROM type, whereof the size of a usable area 110 may be modified after personalization.

The microcircuit card 100 also comprises an electronic circuit 120 that in the embodiment described here is a cryptographic unit.

In a manner that is known in the art, the microcircuit card 100 also receives a signal from a clock CLOCK external to the card, this clock signal being supplied to the various components of the card.

In the particular embodiment described here, the microcircuit card 100 includes a PLL (phase-locked loop) component known to the person skilled in the art for deriving signals at various clock frequencies from the external clock signal CLOCK.

To be more precise, in the embodiment described here, the usable area 110 of the memory EEPROM comprises a register mult_clk for storing a multiplier factor that is applied to the frequency of the signal from the external clock CLOCK.

When the microcircuit card is powered up, the processor CPU reads this register mult_clk and programs the PLL component with the value contained in this register, the clock signal at the output of the PLL component then being applied to certain components of the card.

In the embodiment described here, the PLL component modifies the calculation speeds of the processor CPU and the cryptographic unit 120.

The microcircuit card 100 according to the invention comprises means RX for receiving a command 200, a preferred embodiment of which is described next with reference to FIG. 2.

The command 200 comprises a field 210 comprising a predetermined instruction that is analyzed to determine which characteristics of the performance of the card 100 must be modified.

In the embodiment described here, the characteristics of the performance of the microcircuit card 100 that can be modified after personalization are the size of the usable area 110 of the physical memory EEPROM, the frequency of the clock signal, and a software function f used by the processor CPU and the electronic circuit 120.

In the preferred embodiment described here, the instruction 210 consists of a byte in which:

the first bit (bit1) and the second bit (bit2) represent an instruction for creating or destroying a usable area 110 or an instruction for modifying the size of the usable area 110 of the physical memory EEPROM of the microcircuit card 100;

the third bit (bit3) and the fourth bit (bit4) constitute a multiplier factor for the frequency of the clock signal supplied by the external clock CLOCK;

the fifth bit (bit5) represents an instruction for use or non-use of a software function f of the card;

the sixth bit (bit6) represents an instruction for use or non-use of the electronic circuit 120; and the seventh and eighth bits are not used.

In the preferred embodiment described here, the receiver means RX are adapted to receive the command 200 in accordance with the SMS protocol, for example by means of the ENVELOPE command of that protocol, and to store the command 200 in an area of the random access memory RAM.

The microcircuit card 100 also comprises means for authenticating the sender of the command 200.

In a preferred embodiment, the authenticating means comprise cryptographic means for verifying if the command 200 was encrypted with a predetermined authentication key AUTH stored in a portion AUTH of the usable area 110 of the memory EEPROM at the time of personalization of the card.

These cryptographic means may consist in a processing program that is executed by the processor CPU and comprises instructions for implementing a public key decrypting algorithm such as the RSA algorithm known to the person skilled in the art.

In the preferred embodiment described here, to prevent unauthorized execution a second time of a command 200 already received and fraudulently copied, the microcircuit card 100 further comprises synchronization means 130 adapted to verify that the command 200 is unique.

The synchronization means 130 may in particular consist of an electronic circuit implementing the verification test E35 described later with reference to FIG. 3.

In a preferred embodiment, the processor CPU determines, from the command 200, the characteristics(s) of the performance of the microcircuit card 100 that must be modified.

In particular, if the pair (bit1, bit2) consisting of the first bit bit1 and the second bit bit2 of the instruction 210 is equal to (1,1), this means that the size of the usable area 110 of the physical memory EEPROM must be increased, if possible.

In practice, and in the preferred embodiment described here, the microcircuit card 100 comprises, before personalization, a computer file VOID_FILE in the physical memory EEPROM and, when the pair (bit_1, bit_2) is equal to (1, 1), the processor CPU destroys this file VOID_FILE, thereby freeing up a part of the physical memory EEPROM.

In a variant form, if the pair (bit1, bit2) is equal to (1,1), the size of the usable area of the physical memory EEPROM is, if possible, increased, by a reduction in the size of the file VOID_FILE, in a predetermined manner, for example by 16 kbytes.

Similarly, in the preferred embodiment described here, if the pair (bit1, bit2) is equal to (0,0), this means that the size of the usable area 110 of the physical memory EEPROM must, if possible be reduced, by increasing, (if possible) the size of the file VOID_FILE in a predetermined manner, for example by 16 kbytes.

In a variant form, if the pair (bit1, bit2) is equal to (0,0), this means that a file VOID_FILE must be created, if possible, at a predetermined address and of predetermined size in the physical memory EEPROM.

In the embodiment described here, the reception of a command 200 whereof the pair (bit1, bit2) is equal to (1,0) or (0,1) is without effect.

Figure 2:
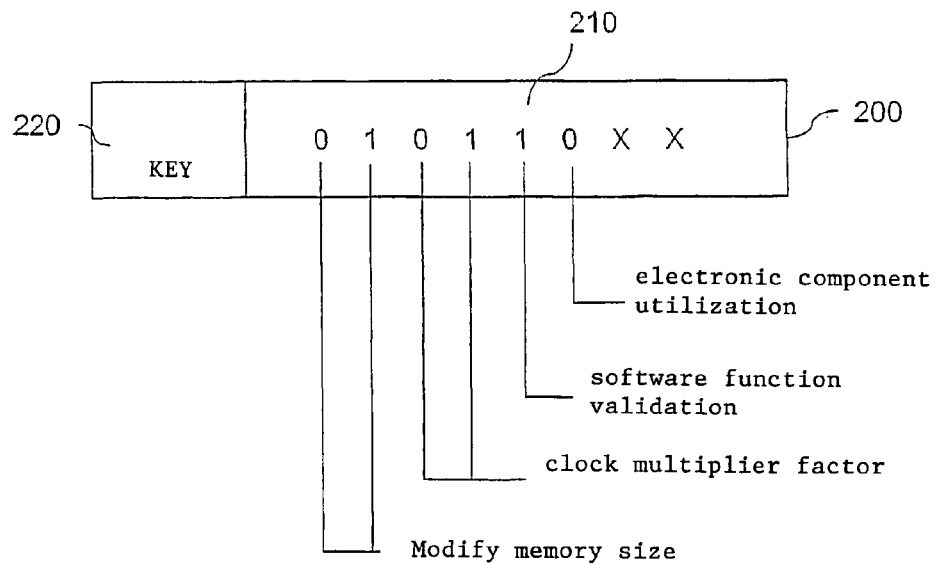
FIG. 2 represents a command conforming to the present invention in a preferred embodiment.

According to the ISO7816 standard, modifying the characteristics of the file VOID_FILE (creation, destruction, change of size) may necessitate a specific key KEY 220 received in the command 200 (as represented in FIG. 2).

In another preferred embodiment, a plurality of files of the same type may be provided before personalization of the card, which progressively increases the size of the usable area of the physical memory EEPROM by destroying these files.

Moreover, when the microcircuit card 100 receives the instruction 210, the processor CPU obtains a clock multiplier factor by reading the third bit bit3 and the fourth bit bit4 of this instruction 210.

In the preferred embodiment described here, this clock multiplier factor is respectively equal to 1, 2 and 3 for values of the pairs (bit3, bit4) respectively equal to (0,1), (1,0), (1,1).

In the particular embodiment described here, this multiplier factor is stored in the register mult_clk of the usable area 110 of the memory EEPROM, this register being read by the processor CPU on power up to set the parameters of the PLL component.

In the embodiment described here, the microcircuit card comprises modification means adapted to allow or prevent the use of a software function f of the card.

In practice, the read only memory ROM comprises a computer program able to invoke this software function f when a soft register of the usable area 110 of the non-volatile memory EEPROM contains the value 1.

On reception of the command 200, the processor CPU reads the value of the fifth bit bit5 of the predetermined instruction received in the command 200 and then writes it in the soft register.

In the example described here, the software function is a cryptographic function or a digital data signature checking function received by the receiver means RX.

The microcircuit card 100 also comprises modification means adapted to allow or prevent the use of all or part of an electronic circuit 120 of the card.

In the embodiment described here, this electronic circuit 120 comprises a cryptographic unit.

In practice, the use of this electronic circuit 120 is possible after writing of the value 1 in a hard register of this component, the value of this register being modified by the processor CPU with the content of the sixth bit bit6 of the predetermined instruction.

In the example described here, modifying the clock frequency and allowing or preventing use of the software function or the electronic component are reversible operations. In another embodiment, at least one of these operations could be non-reversible.

The main steps of a preferred embodiment of a configuration method conforming to the invention are described next with reference to FIG. 3.

The configuration method comprises a first step E10 of personalization. This step is known to the person skilled in the art and is not described in detail here.

Be this as it may, this personalization step consists in writing data specific to the card or to a user of the card in a memory of the card, for example in the EEPROM.

In the example described here, this personalization step comprises in particular writing the value of the authentication key AUTH in a memory EEPROM of the microcircuit card 100.

This personalization step also includes the creation of the file VOID_FILE and its key 220 in the memory EEPROM.

The step E10 is followed by a step E20 of receiving the command 200 described previously with reference to FIG. 2.

The step E20 is followed by a verification step E30 during which the processor CPU authenticates the sender of the command 200. In the embodiment described here, this authentication step is effected by verifying if the command 200 was encrypted with a predetermined authentication key AUTH being stored in a register of the memory EEPROM at the time of personalization of the card.

If this is not the case, the result of the test E30 is negative. This test is then followed by the step E20 already described of receiving a command.

On the other hand, if the sender of the command 200 is authenticated, as authorized to send the command 200, the result of the test E30 is positive.

This test is then followed by a test E35 which verifies that the command 200 is unique. This verification test E35 avoids unauthorized execution for a second time of a command 200 already received and fraudulently copied.

As is known in the art, this verification test E35 may be implemented by incorporating in each command 200 a message number that is incremented for each command and comparing the number received in a particular command 200 with the value of the number received in the preceding command 200.

If the command 200 has already been received, the result of the verification test E35 is negative. This test is then followed by the step E20 already described of receiving a command 200.

On the other hand, if the command 200 is received for the first time, the result of the verification test E35 is positive.

This test is then followed by a step E40 during which the size of the usable area 110 of the physical memory EEPROM is modified as a function of the values of the first and second bits (bit1, bit2) of the predetermined instruction 210 received in the command 200.

In the various embodiments described above with reference to FIG. 1, this step E40 is performed by creating, by destroying the file VOID_FILE contained in the physical memory EEPROM or by modifying the size of this file VOID_FILE.

The step E40 of modifying the size of the usable area 110 of the physical memory EEPROM is followed by a step E60 during which the multiplier factor for the frequency of the external clock CLOCK is stored in the register mult_clk of the usable area 110 of the memory EEPROM; this register is read by the processor CPU on power up to set the parameters of the component PLL, the effect of which is to modify reversibly the clock frequency of the card.

As previously described, the clock frequency multiplier factor is determined by the value of the third bit bit3 and the fourth bit bit4 of the predetermined instruction 210.

The step E60 of modifying the clock frequency is followed by a step E70 during which the processor CPU writes the value of the fifth bit bit5 of the instruction 210 in the soft register of the non-volatile memory EEPROM.

As described above, when this soft register stores the value 1, a software function f for example a cryptographic function such as a digital data signature checking function is rendered accessible in the sense that it can be invoked by a computer program stored in the memory ROM or in the memory EEPROM.

The step E70 is followed by a step E80 during which the processor CPU stores the value of the sixth bit bit6 of the predetermined instruction in the hard register of the electronic circuit 120.

If this hard register holds the value 1, the use of this electronic circuit 120 is authorized. In the preferred embodiment described here, this electronic circuit 120 is a cryptographic unit.

The step E80 is followed by a step E20 already described of reception of a command.

The invention claimed is:

1. A microcircuit card (100) comprising:
   a receiver means (RX) for receiving a command (200);
   means for modifying at least one characteristic of the performance of said card on reception of said command, the modification means being characterized in that they can be used after a step (E10) of personalization of said card; and
   cryptographic means for authenticating the sender of said command,
   wherein said receiver means (RX) are configured to receive said command (200) in accordance with an SMS type protocol.

2. The microcircuit card according to claim 1, wherein the cryptographic means comprises an authentication key.

3. The microcircuit card according to claim 1, wherein the modification means are adapted to determine said at least one performance characteristic as a function of a predetermined instruction (210) received in said command (200).

4. The microcircuit card according to claim 1, wherein said means for modification of at least one performance characteristic are adapted to modify the size of a usable area (110) of a physical memory (EEPROM) of said card.

5. The microcircuit card according to claim 4, wherein said modification of the size of a usable area (110) of a physical memory (EEPROM) is effected by creating, destroying at least one specific file (VOID_FILE) or by modifying the size of at least one specific file (VOID_FILE) comprised in said physical memory.

6. The microcircuit card according to claim 1, wherein said means for modification of at least one performance characteristic are adapted to modify a clock frequency of said card, reversibly or not.

7. The microcircuit card according to claim 1, wherein said means for modification of at least one performance characteristic are adapted to allow or prevent the use of at least one software function (f) of said card, reversibly or not.

8. The microcircuit card according to claim 1, wherein said means for modification of at least one performance characteristic are adapted to allow or prevent the use of all or part of an electronic circuit (120) of said card, reversibly or not.

9. The microcircuit card according to claim 8, wherein said electronic circuit (120) is a cryptographic unit.

10. The microcircuit card according to claim 1, characterized in that it further comprises synchronization means (130) adapted to verify that said command (200) is unique.

11. A method of configuring a microcircuit card (100) comprising the steps of:
    personalizing (E10) said card;
    receiving (E20) a command (200);
    cryptographically authenticating the sender of said command; and
    modifying (E40, E60, E70, E80) at least one characteristic of the performance of the card on reception of said command (200),
    wherein said receiving step (E20) receives the command in accordance with an SMS type protocol.

12. The method according to claim 11, wherein, during said modifying step (E40, E60, E70, E80), said at least one performance characteristic is determined as a function of a predetermined instruction (210) received in said command (200).

13. The method according to claim 11, wherein, during said modifying step (E40), the size of a usable area (110) of a physical memory (EEPROM) of said card is modified.

14. The method according to claim 13, wherein, during said modification of the size of a usable area (110) of a physical memory (EEPROM), at least one specific file (VOID_FILE) included in said physical memory is created, or destroyed or the size of at least one specific file (VOID_FILE) included in said physical memory is modified.

15. The method according to claim 11, wherein, during said modifying step (E60), a clock frequency of said card is modified, reversibly or not.

16. The method according to claim 11, wherein, during said modifying step (E70), the use of at least one software function (f) of said card is allowed or prevented, reversibly or not.

17. The method according to claim 11, wherein, during said modifying step (E80), the use of all or part of an electronic circuit (120) of said card is allowed or prevented, reversibly or not.

18. The method according to claim 17, wherein said electronic circuit (120) is a cryptographic unit.

19. The method according to claim 11, further comprising the step of:
    verifying (E35), prior to said modifying step (E40), that said command (200) is unique.

* * * * *